United States Patent
Warnecke

(10) Patent No.: US 6,685,010 B2
(45) Date of Patent: Feb. 3, 2004

(54) DEVICE FOR INWARD AND/OR OUTWARD TRANSFER OF MATERIAL TO BE CONVEYED

(75) Inventor: Karl Warnecke, Sibbesse (DE)

(73) Assignee: Transnorm System GmbH, Harsum (DE)

( * ) Notice: Subject to any disclaimer, the term of this patent is extended or adjusted under 35 U.S.C. 154(b) by 0 days.

(21) Appl. No.: 10/086,970

(22) Filed: Feb. 28, 2002

(65) Prior Publication Data
US 2002/0121429 A1 Sep. 5, 2002

(30) Foreign Application Priority Data
Mar. 3, 2001 (DE) .......................... 201 03 764

(51) Int. Cl.⁷ .......................... B65G 23/44; B65G 39/10
(52) U.S. Cl. ...................................... 198/814; 198/839
(58) Field of Search .................. 198/839, 835, 198/813, 814

(56) References Cited

U.S. PATENT DOCUMENTS

| 2,973,084 A | | 2/1961 | Sinden et al. | |
|---|---|---|---|---|
| 4,633,996 A | * | 1/1987 | Waterhouse | 198/370.1 |
| 4,648,504 A | * | 3/1987 | Francioni | 198/606 |
| 5,083,657 A | * | 1/1992 | Kelsey | 198/811 |
| 5,743,379 A | * | 4/1998 | Warnecke | 198/839 |
| 5,871,085 A | * | 2/1999 | Yagi | 198/835 |

FOREIGN PATENT DOCUMENTS

| DE | 545 542 | 3/1932 | |
|---|---|---|---|
| DE | 949 636 | 9/1956 | |
| DE | 36 10 544 | 10/1986 | |
| DE | 3726747 A1 * | 2/1989 | .......... B65G/15/60 |
| DE | 195 35 345 | 3/1997 | |
| DE | 201 03 764 | 8/2001 | |
| EP | 0 678 464 | 3/1995 | |
| EP | 0678464 | 10/1995 | |
| FR | 2 771 080 | 11/1997 | |
| GB | 358 581 | 10/1931 | |
| GB | 2 189 758 | 11/1987 | |
| GB | 2189758 A * | 11/1987 | .......... B65G/15/62 |
| JP | 02-193803 | 7/1990 | |
| JP | 2-193803 * | 7/1990 | .......... B65G/15/22 |
| WO | WO 00/47499 | 8/2000 | |

* cited by examiner

Primary Examiner—Joseph E. Valenza
Assistant Examiner—Mark A. Deuble
(74) Attorney, Agent, or Firm—Collard & Roe, P.C.

(57) ABSTRACT

A device for inward and outward transfer of material comprises a conveyor section with a continuous belt for receiving the material at an angle, and an airlock section and a guide section for guiding the continuous belt. The airlock section has a rectangular end area and an acute-angle end area. There is a drive having a driving drum and a back-up roller. The drive is arranged in proximity to the rectangular end area of the airlock section and the back-up roller is displaceable in a direction of the driving drum.

11 Claims, 6 Drawing Sheets

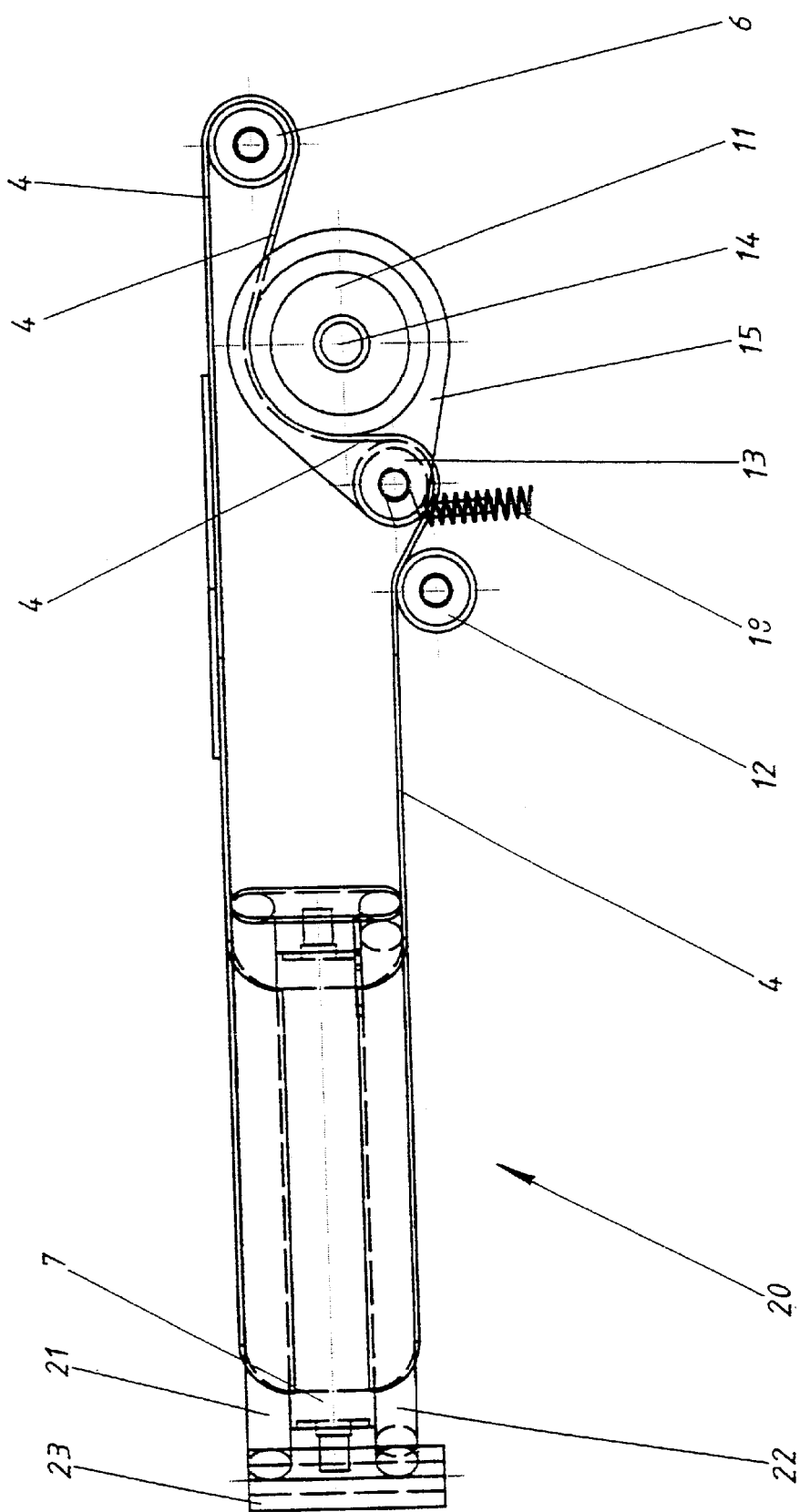

DEVICE FOR INWARD AND/OR OUTWARD TRANSFER OF MATERIAL TO BE CONVEYED

BACKGROUND OF THE INVENTION

1. Field of the Invention

This invention relates to a device for inward and/or outward transfer of material to be conveyed at an angle into a conveyor section with a continuous belt which is guided around an airlock section and a guide section. The airlock section has a rectangular end area and an acute-angle end area. There is a drive having a drive roller and a back-up roller.

2. The Prior Art

Such a device, namely a belt conveyor with an inward and outward transfer device, is known from European Patent 0 678 464 B1. With such a device, material to be conveyed is sent to a conveyor section. An end area of the belt conveyor is designed with an acute angle for this purpose, i.e., the angle formed by border to the direction of travel of the belt deviates from a right angle and forms an angle of 45° or 30°, for example, to the direction of travel, so that the belt conveyor or the device for supplying material to be conveyed can be applied to the main conveyor section at an angle different from 90°. The part of the device over which the material to be conveyed is transported is referred to as the airlock section, and a second part of the device over which the continuous belt is guided is referred to as the guide section. In European Patent 0 678 464 B1, in addition to a driving drum, a guide roller, which is referred to as a back-up roller, is provided, to guide the lower strand of the conveyor belt without belt tension such that the belt is wrapped around the driving drum by more than 180°. At the start of rotation of the driving drum, a very high traction can develop without having to apply a belt tension which would lead to an unwanted increase in friction.

SUMMARY OF THE INVENTION

It is therefore an object of the present invention to create a device of the type defined above which is designed to be especially compact and permits low-maintenance operation.

The invention comprises a device for inward and outward transfer of material comprising a conveyor section with a continuous belt for receiving the material at an angle, and an airlock section and a guide section for guiding the continuous belt. The airlock section has a rectangular end area and an acute-angle end area. There is a drive having a driving drum and a back-up roller.

According to the invention, the drive is arranged in proximity to the rectangular end area of the airlock section, and the back-up roller is displaceable in the direction of the driving drum. This permits an especially compact design, because the guide section can be made especially short because no drive need be provided in this area. As a result, several devices for inward and/or outward transfer may be arranged on a comparatively short section of a conveyor section. The drive is arranged in the rectangular end area of the airlock section. The driving roller and a respective back-up roller are also arranged there. The back-up roller is displaceable toward the driving drum, so that the belt tension is adjustable on site. Since the length of the continuous belt of the device may vary slightly from one device to the next, the displaceability of the back-up roller and thus such regulation option is especially advantageous.

The back-up roller is preferably displaceable in the circumferential direction toward the driving drum. In an especially preferred embodiment, the back-up roller is mounted so that it can pivot about the axle of the driving drum. In this way, the back-up roller is in a defined state relative to the driving drum, and with a displacement of the back-up roller, the length of the continuous belt is increased or decreased in an especially effective manner. In an especially preferred embodiment of this invention, the back-up roller is acted upon by a certain force to produce a defined belt tension. This yields an automatic adjustment and it is not necessary to monitor the adjustment of the belt tension because it is adjusted automatically.

To this end, the back-up roller is preferably acted upon by a spring which applies this force to produce a defined belt tension. The spring thus pulls the back-up roller in the circumferential direction around the driving drum in the opposite direction from the force acting on the back-up roller through the continuous belt. At a certain belt tension, an equilibrium is established between the force acting from the continuous belt on the back-up roller and the force produced by the spring. As an alternative to the use of a spring to produce the force acting on the back-up roller, it is also possible to use a device which utilizes the equilibrium force and in this way applies tension to the back-up roller toward the continuous belt. Likewise, a pneumatically operated device may also be used to apply tension to the back-up roller with a predetermined force against the continuous belt. A defined belt tension can be adjusted in this way.

In a preferred embodiment of the present invention, the drive acts on a lower strand. In addition to the drive, a guide device is also arranged at the end of the rectangular end area, so that a guide roller is also provided, and then the continuous belt is guided from the guide roller over a nearby driving drum and the back-up roller.

To ensure that the back-up roller will act uniformly on the continuous belt, the back-up roller is preferably held by a continuous cross-member which is guided on both ends and is acted upon by a spring.

In the case of a push-action drive of the continuous belt, where the device operates as an inward transfer device, the back-up roller is preferably pulled in the direction of the acute-angle end area.

Due to the design of the drive in the airlock section, the guide section is preferably designed to be so small that a guide roller arranged in the guide section is arranged in immediate proximity to the continuous belt guided in the airlock section. In another preferred embodiment, the acute-angle end area of the device is also freely accessible and is preferably designed to be foldable toward the inside, so that it is especially simple to change the continuous belt.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 6 shows a cross-sectional view of a device according to FIG. 4.

DETAILED DESCRIPTION OF THE PREFERRED EMBODIMENT

Figure 1:
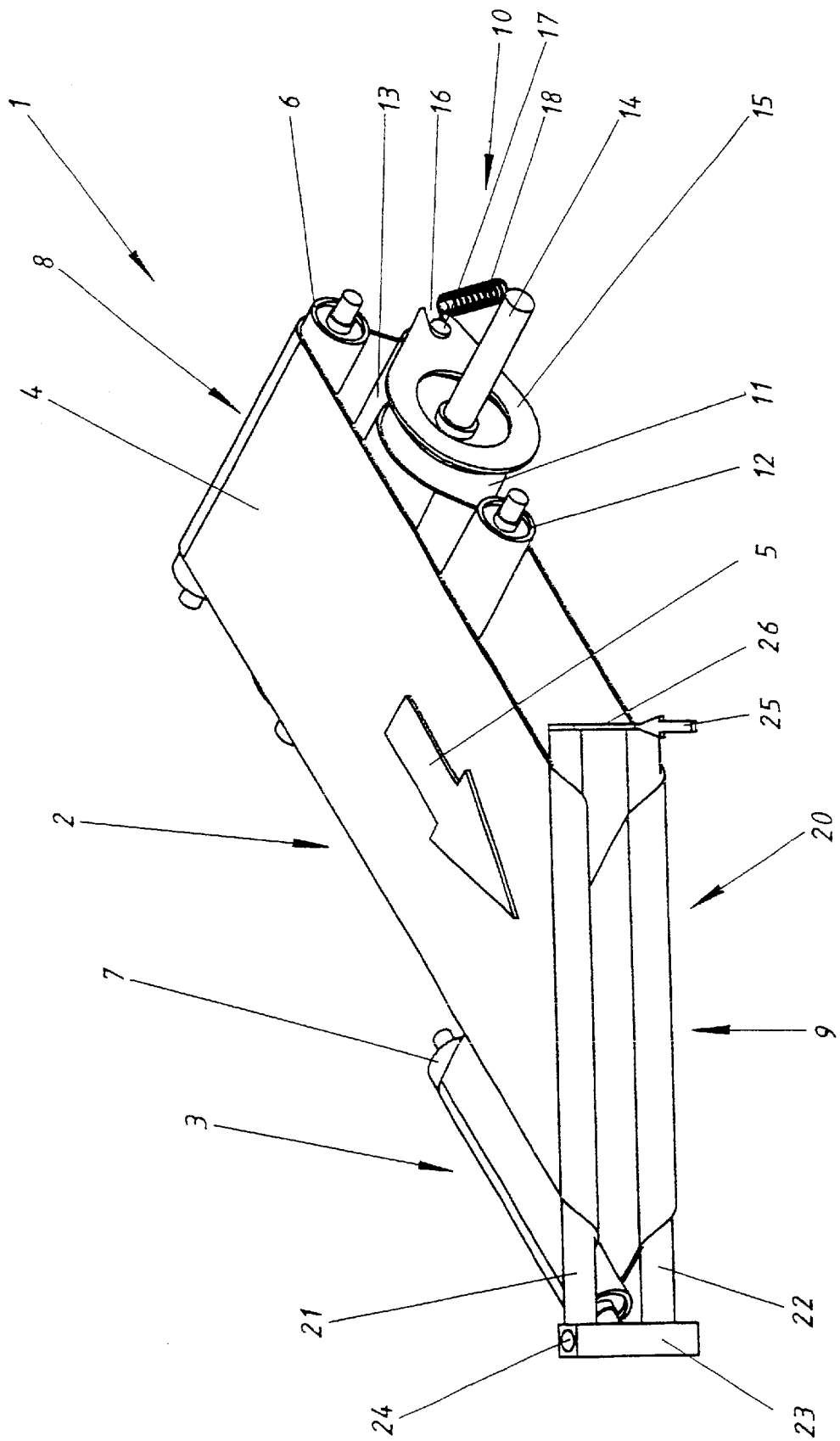
FIG. 1 shows a perspective view of a device according to the invention, designed as an inward transfer device.

Referring now in detail to the drawings, FIG. 1 shows a perspective view of a device 1 according to the invention designed as an inward transfer device. Device 1 has an airlock section 2 and a guide section 3, where material to be conveyed can be transferred inward through inward transfer section 2 from its rectangular end area 8 to the acute-angle end area 9 in the direction of the arrow 5 into a conveyor section passing by the acute-angle end area 9. To this end, device 1 has a continuous belt 4 which is referred to as the upper strand on the upper side and as the lower strand on the lower side. Continuous belt 4 is driven by a drive 10. In the embodiment as an inward transfer device as shown here, the drive 10 operates as a push-action drive, with continuous belt 4 being guided by the drive over a guide roller 6 in the rectangular end area 8 of the inward transfer section 2 and then over a guide or deflection device 20 which forms the acute-angle end area 9 of the guide section 3. The belt runs from there back to a lower part of the guide device 20 and from there back to the drive 10.

Drive 10 is formed essentially by a driving drum 11, a guide roller 12 and a back-up roller 13. Guide roller 12 and back-up roller 13 ensure that continuous belt 4 is in contact with the driving drum over a large angle of wrap and therefore a very large traction can be developed. Driving drum 11 is arranged on the driven axle 14 in a stationary arrangement. Likewise, the guide roller 6 is in a stationary arrangement. On the other hand, the back-up roller 13 is mounted displaceably in the circumferential direction to the driving drum 11, namely in a suspension 15 which is mounted to rotate about axle 14 of driving drum 11. The suspension is designed in the form of a disk with a recess 16 into which axle 17 of driving drum 11 is inserted. With the disk-shaped embodiment shown here, back-up roller 13 is arranged between driving drum 11 and rectangular end area 8 and is also pulled downward by a spring 18, so that there is a certain tension on the continuous belt which runs in the opposite direction beneath back-up roller 13. Through the choice of spring 18 with a certain spring force, the tension of continuous belt 4 can be predetermined without requiring any complicated settings and adjustments by technical personnel. Spring 18 is shown here as a tension spring.

As an alternative, however, it may also be designed so that a rod acting on disk-shaped element 15 is in turn acted upon by a compression spring which is supported on a fixed point on the device and therefore exerts a tensile force on the rod. The compression spring is thus wrapped around the rod and is supported on an eye ring through which the rod passes and is mounted in a stationary arrangement on the device. With the other end, the compression spring is supported on an enlarged end area of the rod, so that the compression spring presses the rod outward on the whole and thus exerts a tensile force on the continuous belt.

The guide device 20 in the acute-angle end area 9 of the airlock section has an upper guide element 21 about which the upper strand is guided, and a lower guide element 22 about which the lower strand is guided. The guide elements 21 and 22 are attached to a holder 23 which is pivotable about a pivot axle 24 so that the guide elements 21 and 22 can be pivoted in the direction of the arrow 25. To do so, the guide elements 21 and 22 are detachably attached in the right edge area, in particular on the frame 26 which is provided there.

Figure 2:
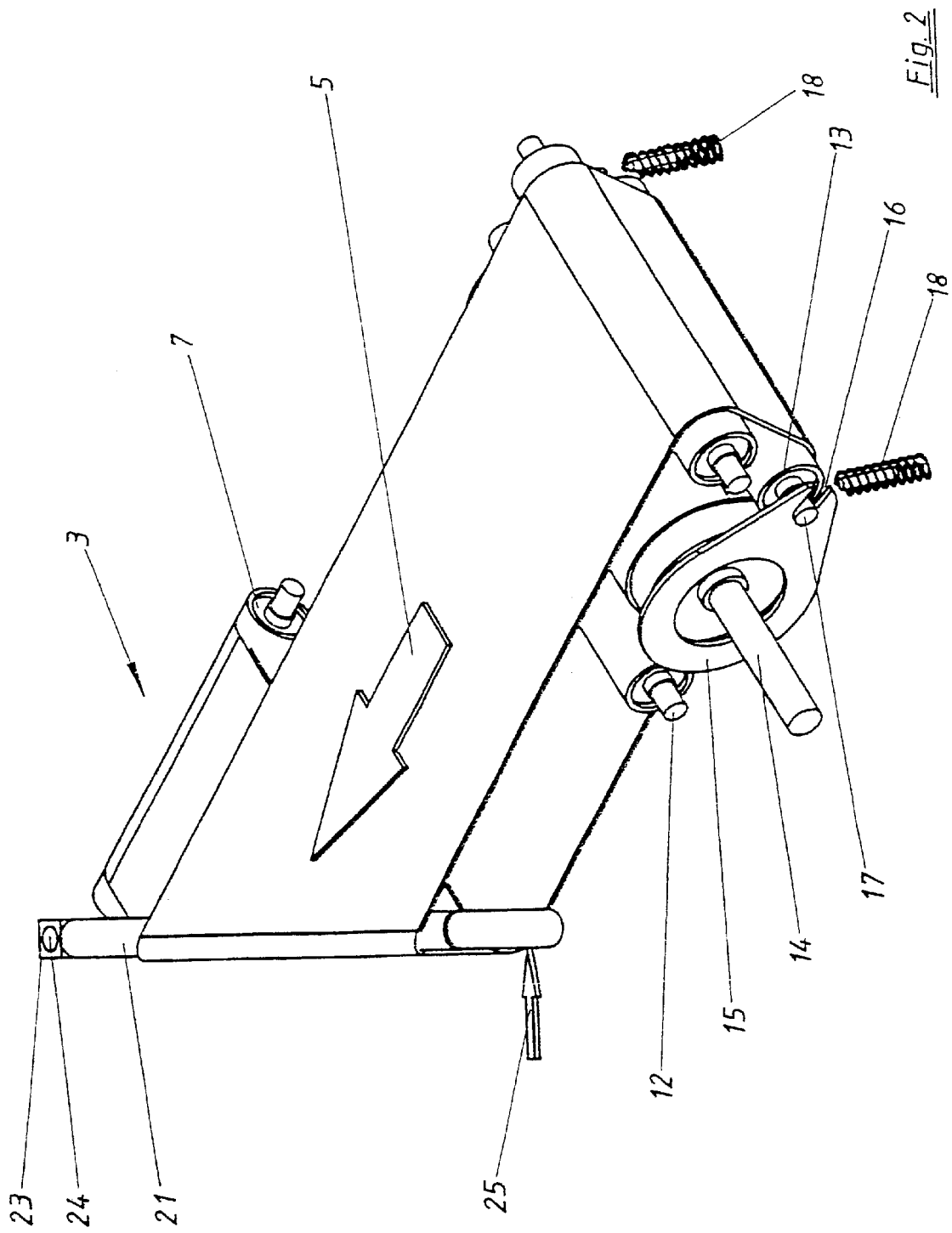
FIG. 2 shows a second perspective view of the device according to FIG. 1.

FIG. 2 shows a second perspective view of the device according to FIG. 1. Back-up roller 13 can be seen even more clearly here. Back-up roller 13 is also arranged on a continuous axle with springs 18 on both sides of axle 17, thus guaranteeing a uniform tensile effect.

Figure 3:
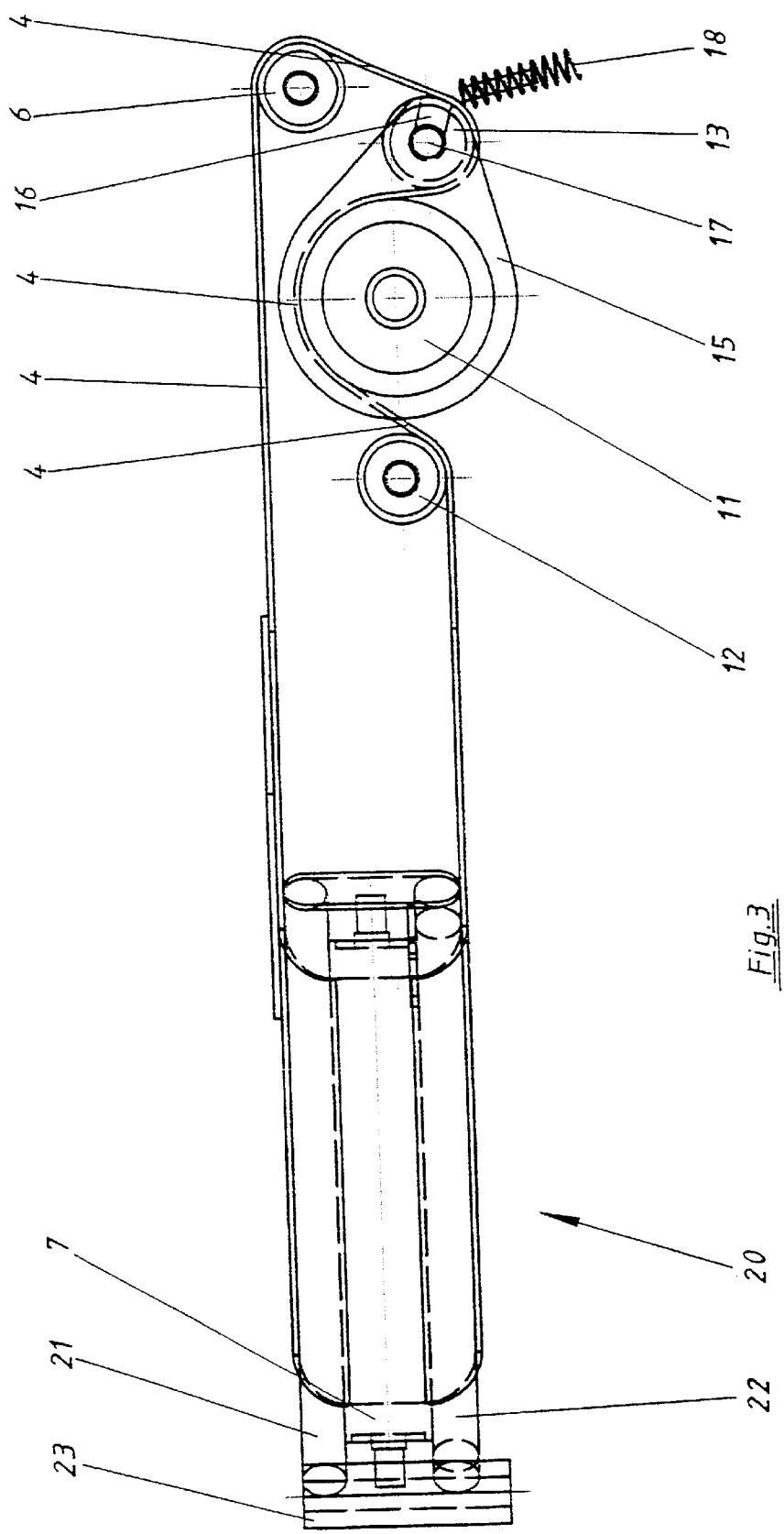
FIG. 3 shows a cross-sectional view of the device according to FIG. 1.

FIG. 3 shows a cross-sectional view through the device according to FIGS. 1 and 2. This also shows clearly that continuous belt 4 is guided about the back-up roller 13, driving drum 11 and guide roller 12, so that driving drum 11 is wrapped over the largest possible area of the circumference. Upper guide element 21 about which the upper strand of the conveyor belt passes is shown in the area of guide device 20; then the belt goes to the guide roller 7 of the guide section 3 and then back over the lower guide element 22, continuing there as the lower strand of the conveyor belt. Guide elements 21 and 22 are arranged on holder 23. Front frame 26 shown in FIG. 1 cannot be seen in this cross-sectional view.

Figure 4:
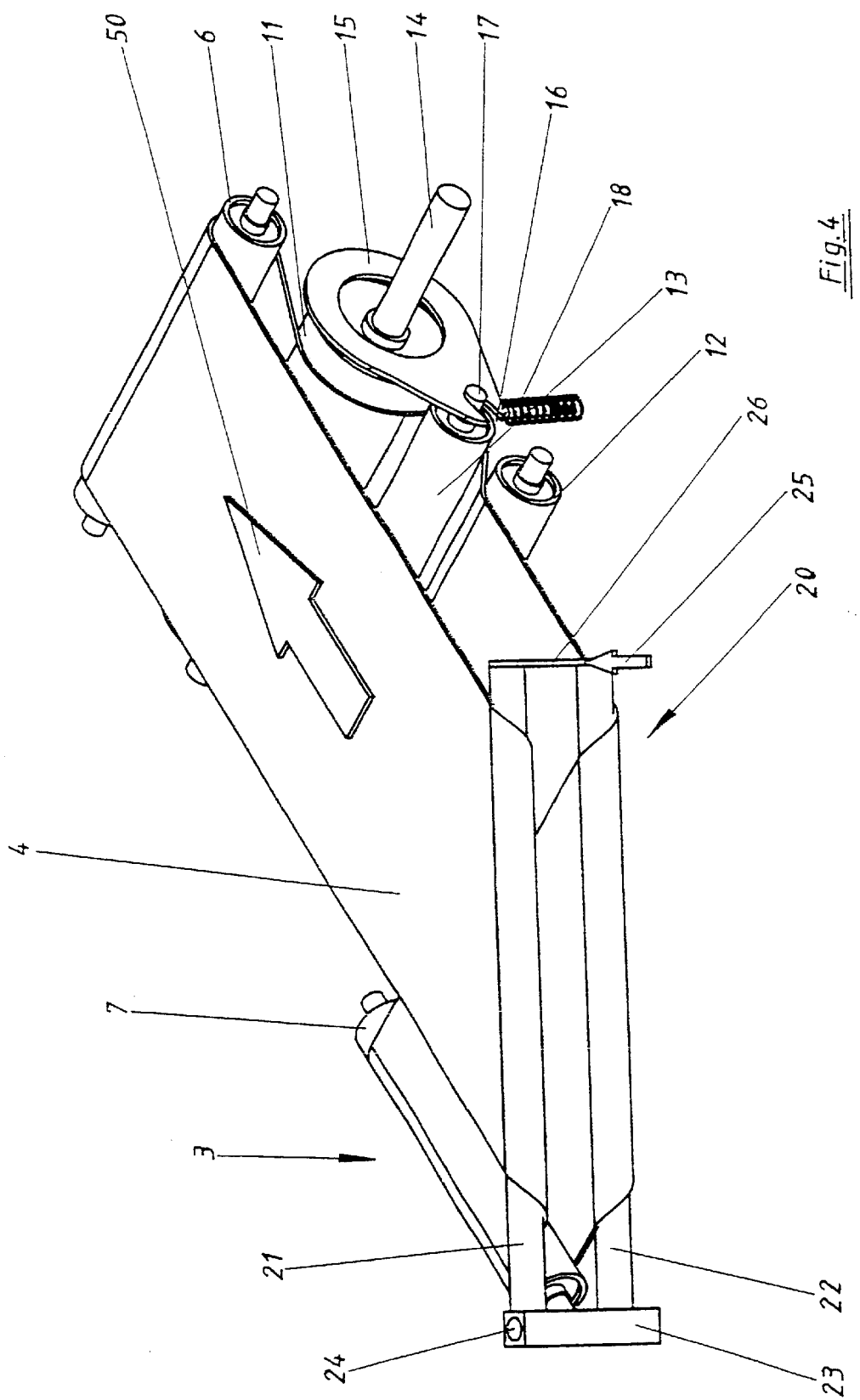
FIG. 4 shows a perspective view of a device according to this invention, designed as an outward transfer device.

FIG. 4 shows a second embodiment of the device according to this invention; it functions as an outward transfer device, as indicated by arrow 50, which shows that the continuous belt 4 runs from the acute-angle end area 9 of the airlock section 2 to the rectangular end area 8 of the airlock section 2. With such an arrangement, it is customary to speak of a tractive drive. Drive 10 is also designed with a guide roller 12, a driving drum 11 and a back-up roller 13, but the sequence of the arrangement of rollers is different from that with the push-action embodiment of FIGS. 1 and 3. Back-up roller 13 is arranged here on a side of the driving drum 11 facing away from the rectangular end area 8 of the airlock section 2 and is therefore between the driving drum 11 and the guide roller 12 assigned to this driving drum 11.

Figure 5:
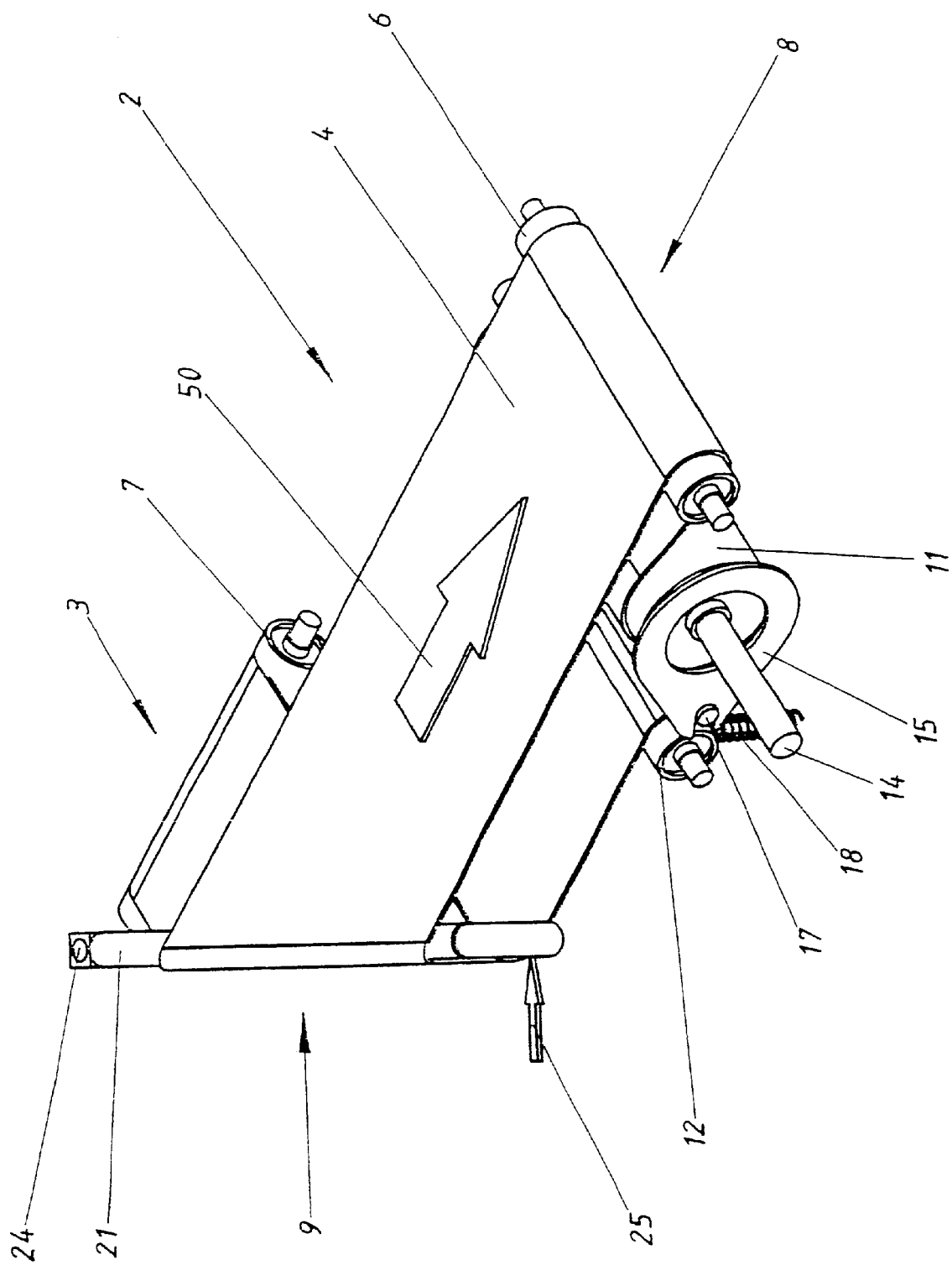
FIG. 5 shows a second perspective view of a device according to FIG. 4.

FIG. 5 shows a second perspective view, and FIG. 6 shows a cross-sectional view. Here again, the same parts are labeled with the same reference numbers.

Accordingly, while only a few embodiments of the present invention have been shown and described, it is obvious that many changes and modifications may be made thereunto without departing from the spirit and scope of the invention.

What is claimed is:

1. A device for inward and outward transfer of material, comprising:

a conveyor section with a continuous belt for receiving the material at an angle;

an airlock section and a guide section for guiding said continuous belt, said airlock section having a rectangular end area and an acute-angle end area;

a drive having a driving drum and a back-up roller, said drive being arranged in proximity to the rectangular end area of the airlock section and said back-up roller being displaceable in a direction of the driving drum, wherein the back-up roller is mounted so that it can pivot about an axle of the driving drum; and a device for generating a force on the backup roller to produce a defined belt tension.

2. A device according to claim 1, wherein the back-up roller is displaceable in a circumferential direction toward the driving drum.

3. A device according to claim 1, wherein the device for generating a force is a spring.

4. A device according to claim 1, wherein the device for generating a force is a pneumatically operated device.

5. A device according to claim 1, wherein the drive acts on a lower strand of the continuous belt.

6. A device according to claim 1, wherein a guide device is arranged on the rectangular end area of the airlock device.

7. A device according to claim 1, wherein the back-up roller is held by a continuous cross-bar which is guided on both ends and is acted upon by a spring.

8. A device according to claim 1, wherein the drive is a push-action drive and wherein back-up roller is arranged on a side of the driving drum facing the rectangular end area.

9. A device according to claim 1, wherein the drive is a tractive drive and wherein the back-up roller is arranged on a side of the driving drum facing away from the rectangular end area.

10. A device according to claim 1, wherein the guide section is short and the back-up roller is positioned in proximity to the continuous belt.

11. A device according to claim 1, further comprising a guide device hinged on the acute-angle end area of the airlock section.

\* \* \* \* \*